(12) United States Patent
Friesen et al.

(10) Patent No.: US 9,580,238 B2
(45) Date of Patent: Feb. 28, 2017

(54) STORAGE TANK WITH DISCHARGE CONVEYOR

(71) Applicant: FB Industries Inc., Winkler (CA)

(72) Inventors: Henry Friesen, Winkler (CA); Peter Friesen, Winkler (CA); Abram Friesen, Morris (CA)

(73) Assignee: FB Industries Inc., Winkler, MB (CA)

(*) Notice: Subject to any disclaimer, the term of this patent is extended or adjusted under 35 U.S.C. 154(b) by 74 days.

(21) Appl. No.: 14/532,408

(22) Filed: Nov. 4, 2014

(65) Prior Publication Data

US 2016/0122125 A1 May 5, 2016

(51) Int. Cl.
| | |
|---|---|
| B65D 88/54 | (2006.01) |
| B65D 88/26 | (2006.01) |
| B65G 65/46 | (2006.01) |
| B65D 88/30 | (2006.01) |
| B65D 90/14 | (2006.01) |

(52) U.S. Cl.
CPC ............ B65D 88/54 (2013.01); B65D 88/26 (2013.01); B65D 88/30 (2013.01); B65D 90/14 (2013.01); B65G 65/46 (2013.01); B65G 65/466 (2013.01); *B65D 2590/0091* (2013.01)

(58) Field of Classification Search
CPC ...... B65D 88/28; B65D 88/30; B65D 88/546; B65G 65/466; E06C 9/08
USPC .................... 198/317; 414/414, 523; 182/84
See application file for complete search history.

(56) References Cited

U.S. PATENT DOCUMENTS

| | | | | |
|---|---|---|---|---|
| 882,499 | A * | 3/1908 | Hull, Sr. .................. | E06C 9/08 |
| | | | | 182/86 |
| 2,563,470 | A * | 8/1951 | Kane ...................... | B65D 88/30 |
| | | | | 280/830 |
| 2,678,737 | A * | 5/1954 | Mangrum ............ | B65D 88/128 |
| | | | | 414/332 |
| 3,100,052 | A * | 8/1963 | Brembeck .............. | B65G 65/46 |
| | | | | 414/326 |
| 4,058,239 | A * | 11/1977 | Van Mill ................ | B65D 88/28 |
| | | | | 193/17 |
| 4,095,705 | A * | 6/1978 | Hood ..................... | B65G 65/46 |
| | | | | 198/532 |
| 4,218,169 | A * | 8/1980 | Arends ..................... | B60P 1/40 |
| | | | | 414/523 |
| 4,398,859 | A * | 8/1983 | Ball ........................ | B60P 1/36 |
| | | | | 414/523 |
| 4,411,581 | A * | 10/1983 | Niewold .............. | B65G 41/002 |
| | | | | 222/163 |

(Continued)

*Primary Examiner* — James Keenan
(74) *Attorney, Agent, or Firm* — Adrian D. Battison; Ade & Company Inc.

(57) ABSTRACT

A storage tank defines a square hopper bottom converging to a bottom discharge located at one corner. The tank sits on a base frame defined by four vertical retractable legs with one leg at the discharge recessed inwardly from the corner. A discharge conveyor is mounted at the discharge for rotation about an upstanding axis at the discharge opening unimpeded by the recessed leg to move the conveyor from a retracted position along a side of the frame to an extended position at a selected angle outwardly from the frame. A horizontal platform and ladder is located at one side of the tank with the ladder being movable to a stored position parallel to the platform and both the ladder and the platform are movable to a stored position along the side of the tank.

19 Claims, 16 Drawing Sheets

(56) References Cited

U.S. PATENT DOCUMENTS

| | | | | | |
|---|---|---|---|---|---|
| 4,540,327 | A * | 9/1985 | Happel | | B60P 1/42 198/317 |
| 4,571,143 | A * | 2/1986 | Hellerich | | B65D 88/30 410/68 |
| 4,586,865 | A * | 5/1986 | Hansen | | B60P 1/36 414/519 |
| 4,798,510 | A * | 1/1989 | Lazenby | | B65D 88/30 222/168 |
| 4,836,421 | A * | 6/1989 | Miyoshi | | B65D 88/30 206/598 |
| 5,103,934 | A * | 4/1992 | Brooks | | E06C 9/08 182/106 |
| 5,339,996 | A * | 8/1994 | Dubbert | | B28C 7/0046 182/186.6 |
| 5,799,962 | A * | 9/1998 | Barnhart | | B60R 3/02 108/131 |
| 6,017,182 | A * | 1/2000 | Grieshop | | B60P 1/42 198/550.1 |
| 6,209,880 | B1 * | 4/2001 | Turnwald | | B60P 1/42 198/671 |
| 6,431,093 | B1 * | 8/2002 | Hansen | | B60R 3/005 108/135 |
| 7,500,817 | B2 * | 3/2009 | Furrer | | A01C 15/003 198/311 |
| 8,191,683 | B2 * | 6/2012 | Rathbone | | E06C 9/12 182/127 |
| 8,302,734 | B2 * | 11/2012 | Krock | | E06C 1/39 182/113 |
| 8,387,824 | B2 * | 3/2013 | Wietgrefe | | B65D 88/30 222/1 |
| 8,434,990 | B2 * | 5/2013 | Claussen | | B60P 1/64 414/332 |
| 2008/0029553 | A1 * | 2/2008 | Culleton | | B65D 88/26 222/460 |
| 2008/0210145 | A1 * | 9/2008 | Petersen | | A01C 15/003 111/11 |
| 2009/0129903 | A1 * | 5/2009 | Lyons, III | | B60P 1/56 414/332 |
| 2010/0278621 | A1 * | 11/2010 | Redekop | | B65D 88/30 414/523 |
| 2014/0064890 | A1 * | 3/2014 | Babcock | | B65D 88/32 414/303 |
| 2014/0227068 | A1 * | 8/2014 | Neufeld | | B60P 1/36 414/304 |

* cited by examiner

STORAGE TANK WITH DISCHARGE CONVEYOR

This invention relates to a storage tank for particulate material with a discharge conveyor mounted on the tank for supply of the material to a receptacle at one side of the tank.

BACKGROUND OF THE INVENTION

The development of hydraulic fracturing of underground rock to release gas, commonly known as "fracing", has led to the development of various tank arrangements which are typically portable to be moved to a remote fracking site.

There is a requirement therefore for a tank which is portable on road transport and is mounted on a frame to stand in stable position on the ground. The tank should be readily filled with particulate material such as sand and should readily discharge the stored material to a receptacle at a position spaced outwardly from the tank.

SUMMARY OF THE INVENTION

According to the invention there is provided a storage tank for particulate material comprising:

a tank having a hopper bottom converging to a bottom discharge opening;

a base frame supporting the tank at a position raised from a ground surface on which the base frame can stand;

the hopper bottom being shaped to locate the discharge opening at a side of the base frame;

a discharge conveyor mounted at the discharge opening to transport the particulate material from the discharge opening to an outer end of the conveyor;

the conveyor being mounted for rotation about an upstanding axis at the discharge opening to move the conveyor from a retracted position along a side of the frame to an extended position at a selected angle outwardly from the frame;

the frame being recessed at the discharge opening so that the conveyor is free to rotate from the retracted position to the extended position at the side of the base frame without restriction by the frame.

Preferably the tank is rectangular in plan and the discharge opening is arranged at one corner. However other shapes of tank can also be used including circular plan tanks.

Preferably the frame includes a plurality of upstanding legs and the frame is recessed by one leg being recessed inwardly from the side of the frame relative to a symmetrical array of the legs.

For example the tank can be rectangular and the frame includes four upstanding legs arranged generally at respective corners of the tank and wherein one leg of the four legs is recessed inwardly from the respective corner.

Preferably the hopper bottom includes four sides each extending along a respective side of the rectangular tank and each converging to one corner of the tank at the recessed leg. However the hopper bottom can be circular in plan to form a distorted cone rather than a distorted pyramid.

Preferably the conveyor is movable from a first retracted position extending from the corner along a first side of the tank to a second one of the legs to a second retracted position extending from the corner along a second side of the tank to a third one of the legs. However the storage position can be provided only at one of the second and third legs.

Preferably the conveyor rotates in a horizontal plane radial to the axis. However it can also depend at an angle outwardly and downwardly.

Preferably the conveyor comprises a tubular duct with a conveying member such as an auger or belt inside the duct. This allows the tube to lie in the horizontal direction with the material being actively transported along the tube by the auger.

Preferably there is provided a drive member carried on the tank at the discharge opening for rotating the conveyor about the axis. However the conveyor may be moved manually by a user grasping and pulling the outer end.

Preferably the frame comprises a plurality of legs each of which is extendible from a retracted position in which the conveyor is immediately adjacent the ground to an extended position. This allows the legs to be fully retracted for transport into vertical sleeves along the tank.

Preferably there is provided a platform mounted on the frame at one side of the tank and extending horizontally outwardly therefrom and a ladder which extends downwardly from one end of the platform and wherein the ladder is movable to a stored position parallel to the platform and both the ladder and the platform are movable to a stored position along the side of the tank.

Preferably the platform folds upwardly about a hinge line along the side of the tank and the ladder folds up underneath the platform so as to be located outwardly of the platform in the stored position.

According to a second aspect of the invention there is provided a storage tank for particulate material comprising:

a tank having a hopper bottom converging to a bottom discharge opening;

a base frame supporting the tank at a position raised from a ground surface on which the base frame can stand;

the hopper bottom being shaped to locate the discharge opening at a side of the base frame;

a discharge conveyor mounted at the discharge opening to transport the particulate material from the discharge opening to an outer end of the conveyor;

the conveyor being mounted for rotation about an upstanding axis at the discharge opening to move the conveyor from a retracted position along a side of the frame to an extended position at a selected angle outwardly from the frame;

wherein the tank is rectangular and the discharge opening is arranged at one corner;

wherein there is provided a platform mounted on the frame at one side of the tank and extending horizontally outwardly therefrom and a ladder which extends downwardly from one end of the platform;

and wherein the ladder is movable to a stored position parallel to the platform and both the ladder and the platform are movable to a stored position along the side of the tank.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
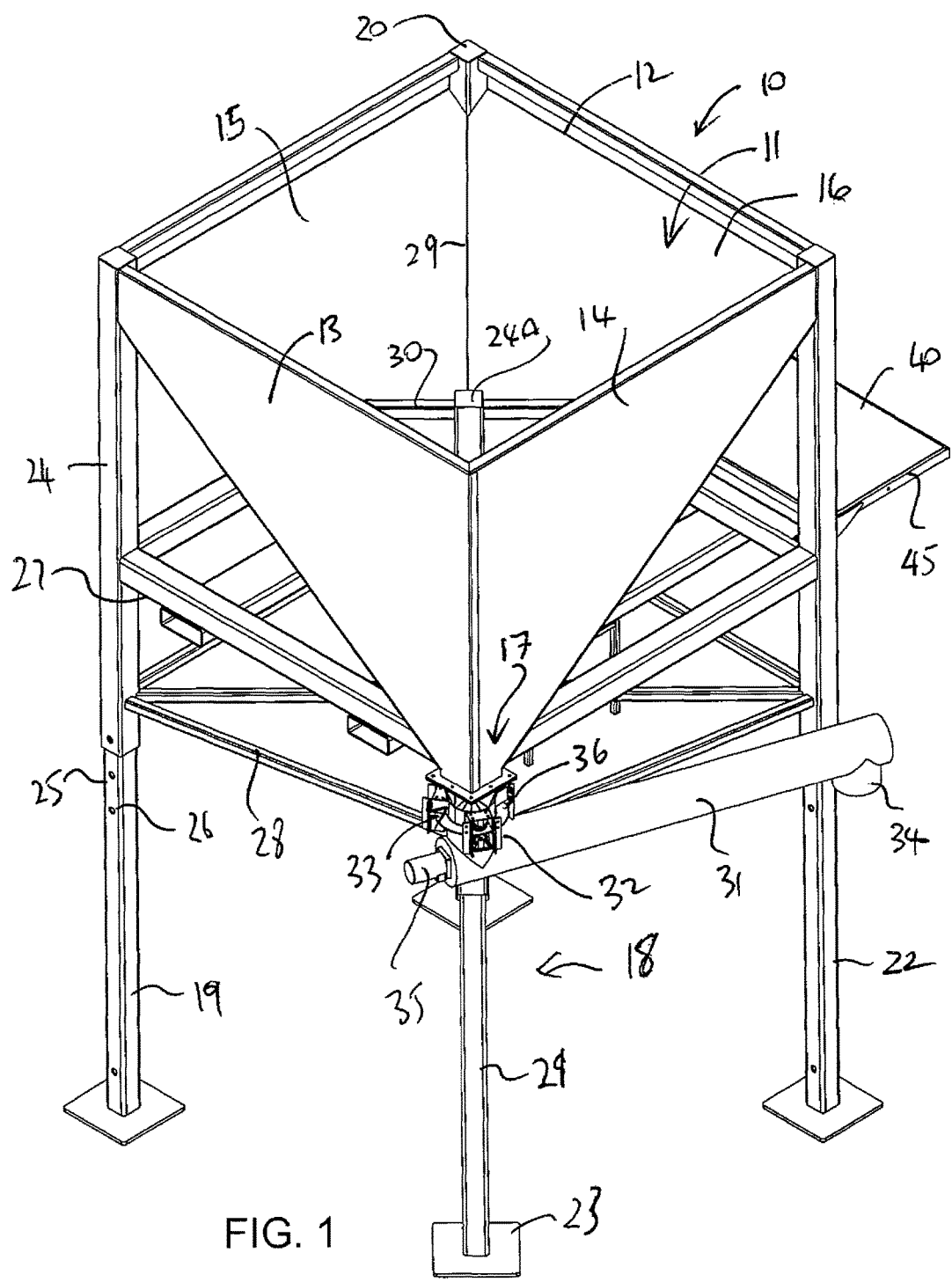
FIG. 1 is an isometric view from the top and one side of a storage and discharge tank according to the present invention showing the tank in the erected working position.

As shown in the Figures is a storage tank for particulate material such as frac sand which is shown in a transport position shown in FIGS. 9 to 16 where the whole structure can be carried on a flat-bed trailer with a total width of the order of 8 feet to allow it to be carried on traditional legal width trailers. In FIGS. 1 to 8 the tank is shown in the assembled or erected condition where the tank is supported from the ground at a site where the fracing may occur. This site can often be remote so that the tank sits on a frame structure in a manner which allows it to be supported stably from the ground even if somewhat uneven.

The tank has a hopper bottom 11 with an open top 12 so that the material can be readily deposited from above. While the tank shown has no vertical wall portions extending upwardly from the hopper bottom 11, such walls can be provided for increased storage capacity.

The hopper bottom has four sides 13, 14, 15, 16 converging to a bottom discharge opening 17. The four sides are offset so that the two sides 13 and 14 lie in vertical planes at right angles to one another and bottom discharge opening 17 is arranged at the bottom of the two vertical sides. The two sides 15 and 16 are arranged at a relatively large angle to the vertical so as to converge to the discharge opening at the corner defined by the walls 13 and 14. The walls 15 and 16 are inclined sufficiently to allow particulate material stored in the tank to slide to the discharge opening. The open top 12 is thus square with four sides converging to four corners.

A base frame 18 supports the tank at a position raised from a ground surface on which the base frame can stand to hold the tank sufficiently raised from the ground to allow a vehicle to move underneath the height of the discharge opening 17 for receiving the material from the tank.

The frame 18 includes a plurality of upstanding legs 19, 20, 21 and 22 arranged generally at respective corners of the tank. Each vertical leg has a horizontal bottom plate 23 to sit on the ground.

The legs 19, 20 and 22 are arranged directly at the corners of the tank spaced from the discharge opening 15 and stand vertically therefrom with the side edges of the walls 15, 16 being connected to the legs. The leg 21 is recessed inwardly from the side of the frame at the corner defined between the walls 13 and 14 so that the leg 21 is arranged inwardly of the discharge opening 17 and does not interfere with the discharge opening.

Each of the legs comprises an upper sleeve 24 and a lower leg portion 25 retractible into an open bottom end of the sleeve and movable to an extended position where the height of the leg can be adjusted by selecting a respective one of a plurality of adjustment holes 26. In the retracted position the discharge opening 17 is immediately adjacent the ground so that the bottom of the sleeves 24 is close to the ground to make a stable structure for transport. Each of the sleeves 24 of the legs 19, 20 and 22 is connected to the top open edge of the tank at a corner and is connected to the next by a horizontal beam 27 located underneath the top edge together with suitable cross-bracing 28 arranged both leg to leg and diagonally to form a stable structure holding the legs at right angles to the open top.

The recessed leg 21 has a sleeve 24A which passes through the tank at a junction line 29 between the walls 15 and 16 so that a top portion of the sleeve 24A extends into the tank. This leg is braced relative to the tank and held vertical by the cross-bracing 28 and by a cross-beam 30 inside the tank.

Thus the hopper bottom defined by the walls 13 to 16 is shaped to locate the discharge opening 17 at a side of the base frame 18 adjacent to and outwardly of the leg 21. A valve 33 is located at the discharge opening to control discharge of the material from the tank at the control of an operator optionally using an electric remote control system.

A discharge conveyor 31 is mounted at the discharge opening 17 underneath the valve 33 on a swivel coupling 32 to transport the particulate material from the discharge opening to an outer end of the conveyor at a discharge chute 34. The conveyor is held generally horizontal by the coupling 32 and is mounted for rotation about an upstanding axis at the discharge opening 17 to move the conveyor from a retracted position along a side of the frame to an extended position at a selected angle outwardly from the frame. The conveyor can be retracted wither to the position where the chute 34 is adjacent the leg 22 or through roughly 270 degrees to the leg 19. Between those two retracted positions, the chute is located at a position spaced outwardly from the tank for discharge of the material into a receptacle, particularly the tank of a transport truck, which is brought for the purpose to a position alongside the legs of the tank. The conveyor comprises a cylindrical tube which contains an auger or other transport device driven by a motor 35 at the end of the conveyor adjacent the opening 17 and carried on the swivel coupling.

As the frame 16 is recessed at the discharge opening by the recessed position of the leg 21 the conveyor is free to rotate from the retracted positions to the extended position at the side of the base frame without restriction by the frame or by contact of the motor or conveyor on the leg 21. The conveyor thus rotates in a horizontal plane radial to the vertical axis at the discharge opening 17 and the swivel coupling includes a drive member 36 carried on the tank at the discharge opening for rotating the conveyor about the axis.

Figure 2:
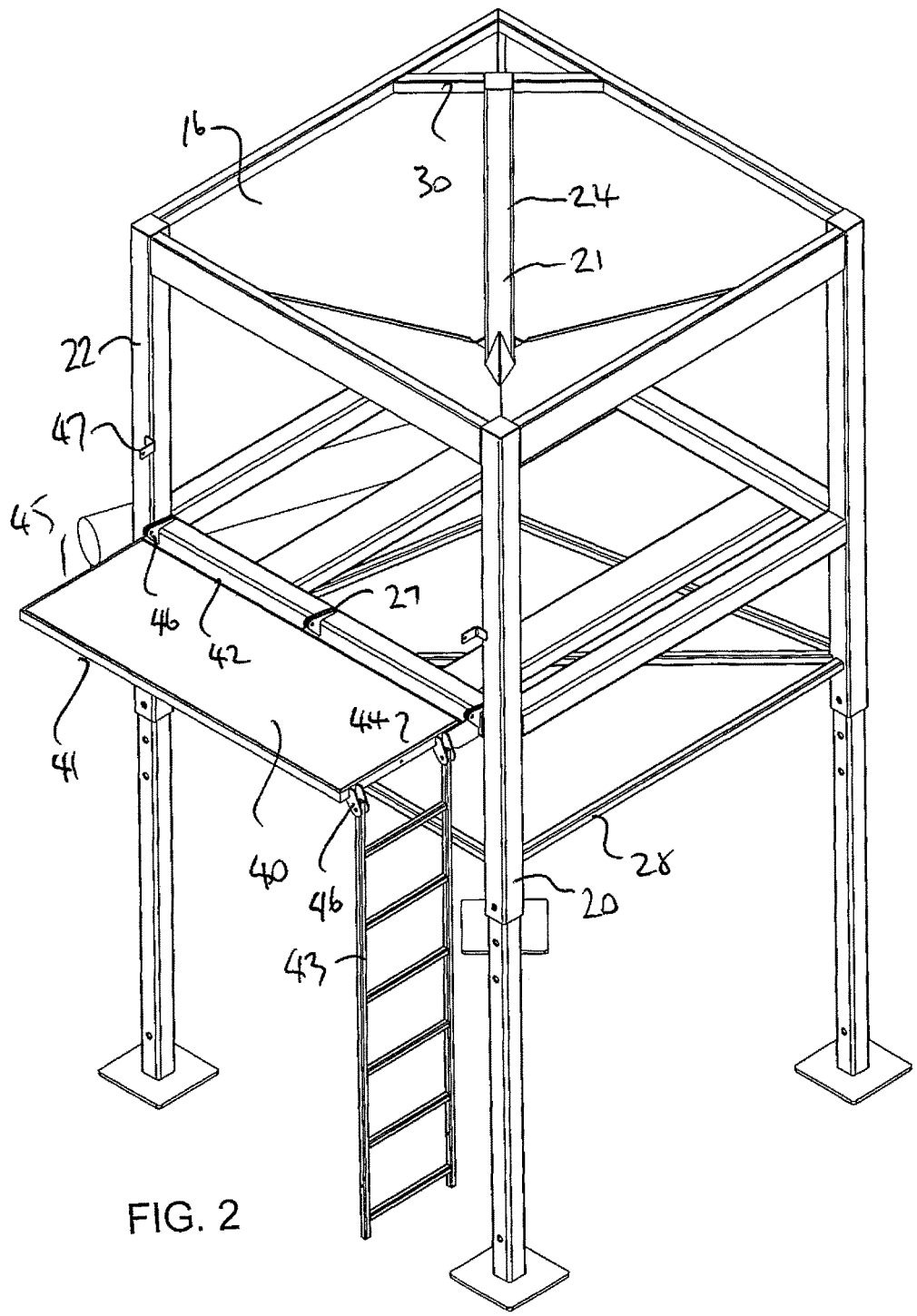
FIG. 2 is an isometric view from the top and opposite side of the tank of FIG. 1.
Figure 3:
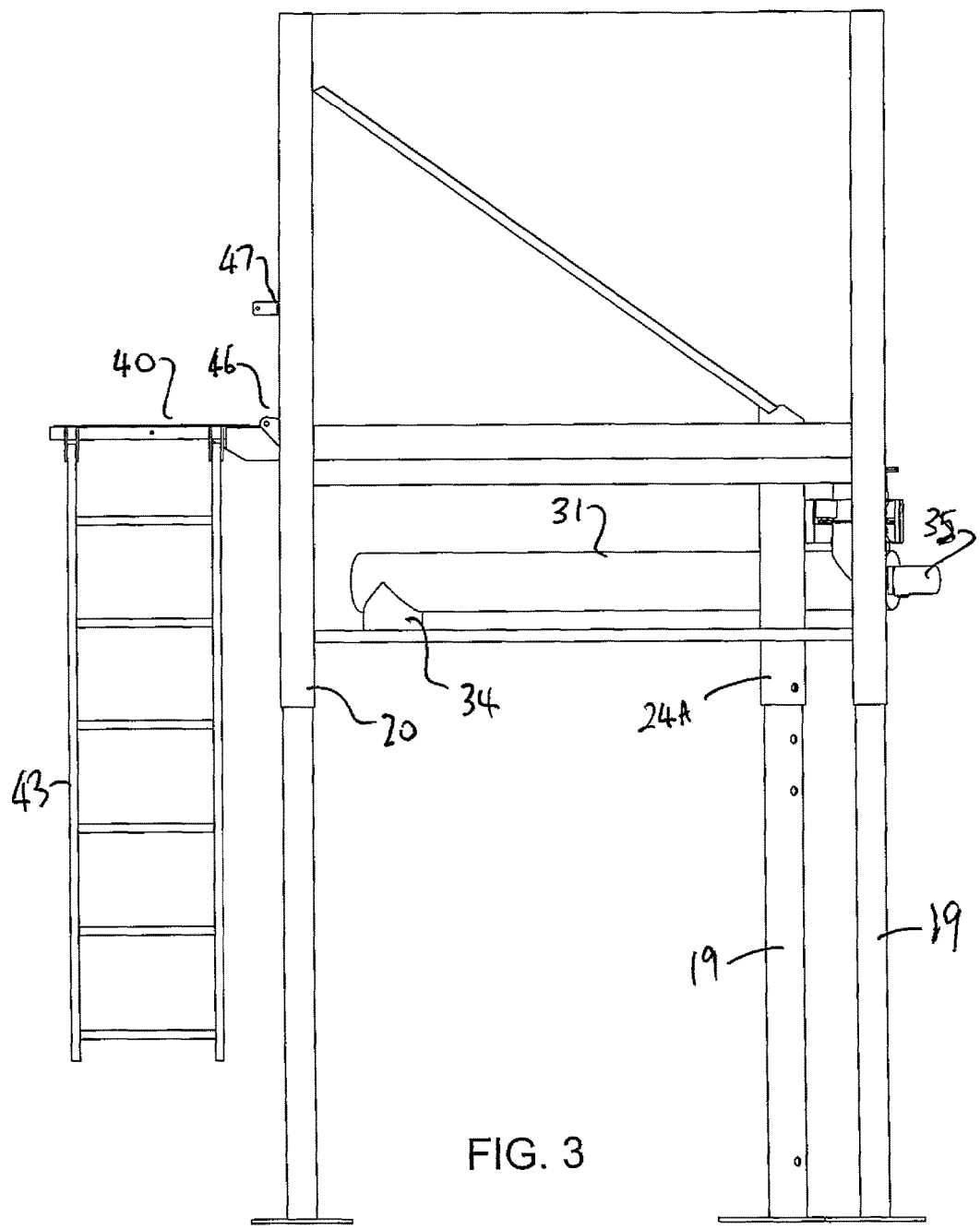
FIGS. 3, 4, 5 and 6 are respective first side elevational views of the four sides of the tank of FIG. 1.
Figure 4:
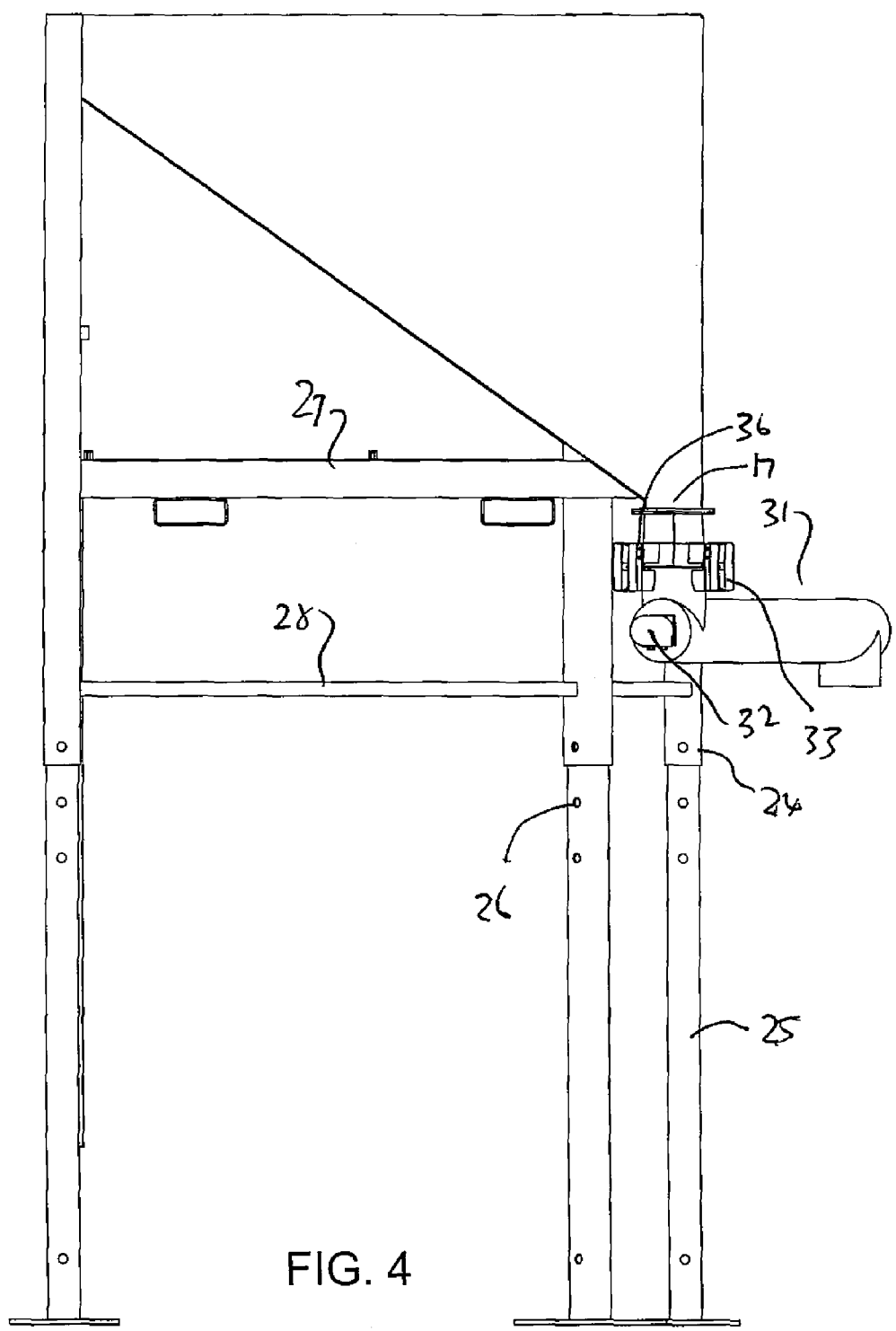
Figure 5:
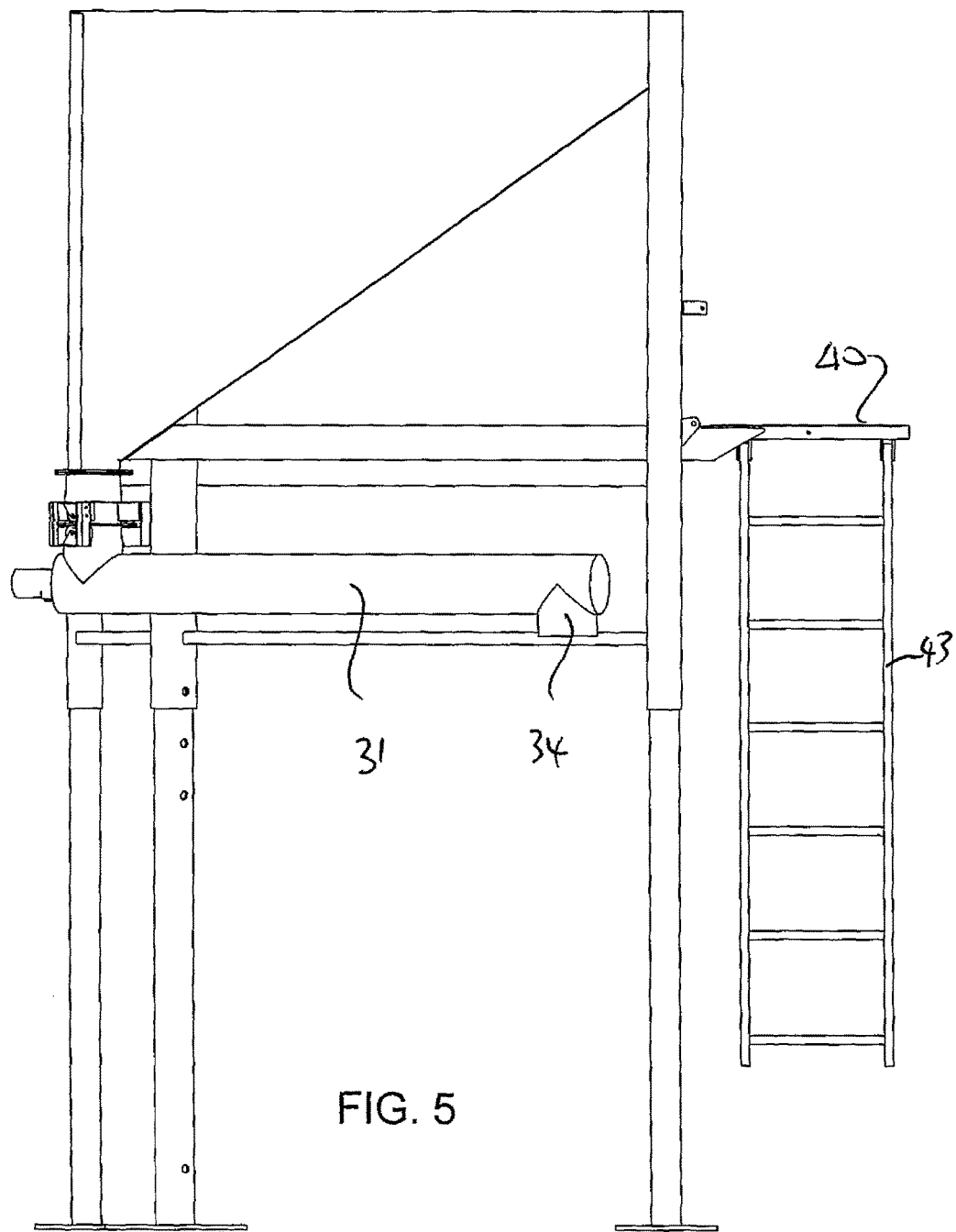
Figure 6:
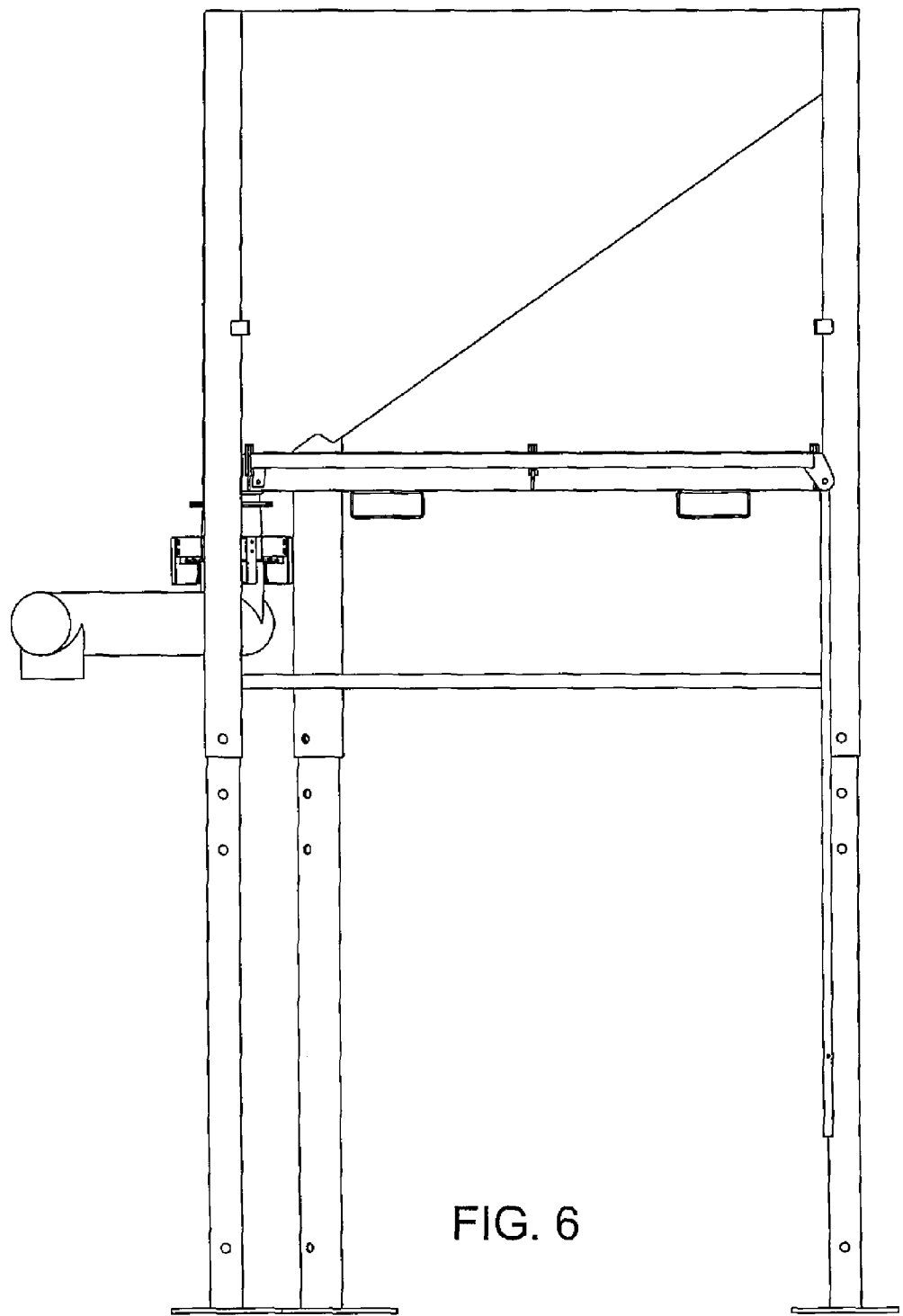
Figure 7:
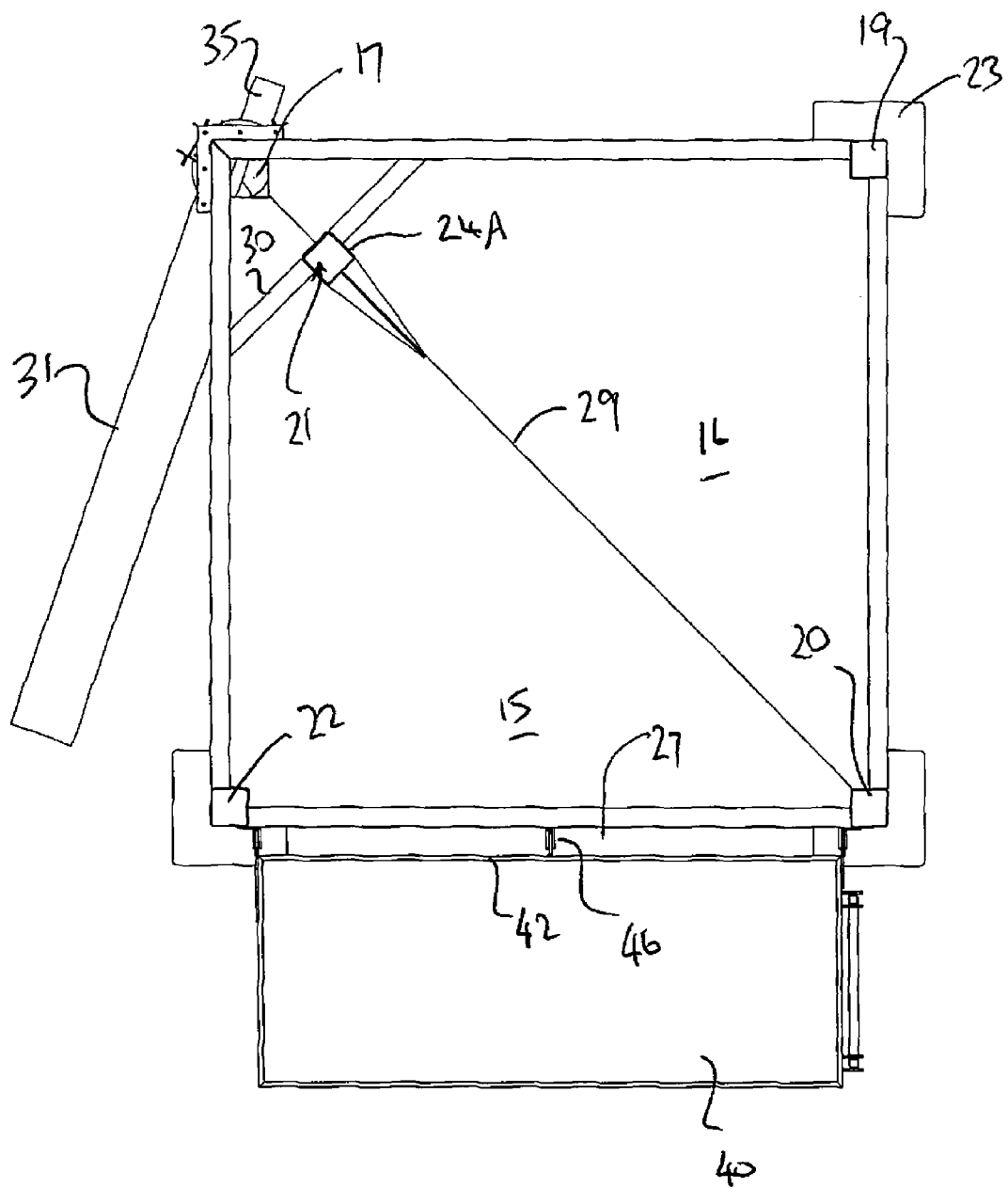
FIG. 7 is a top plan view of the tank of FIG. 1.
Figure 8:
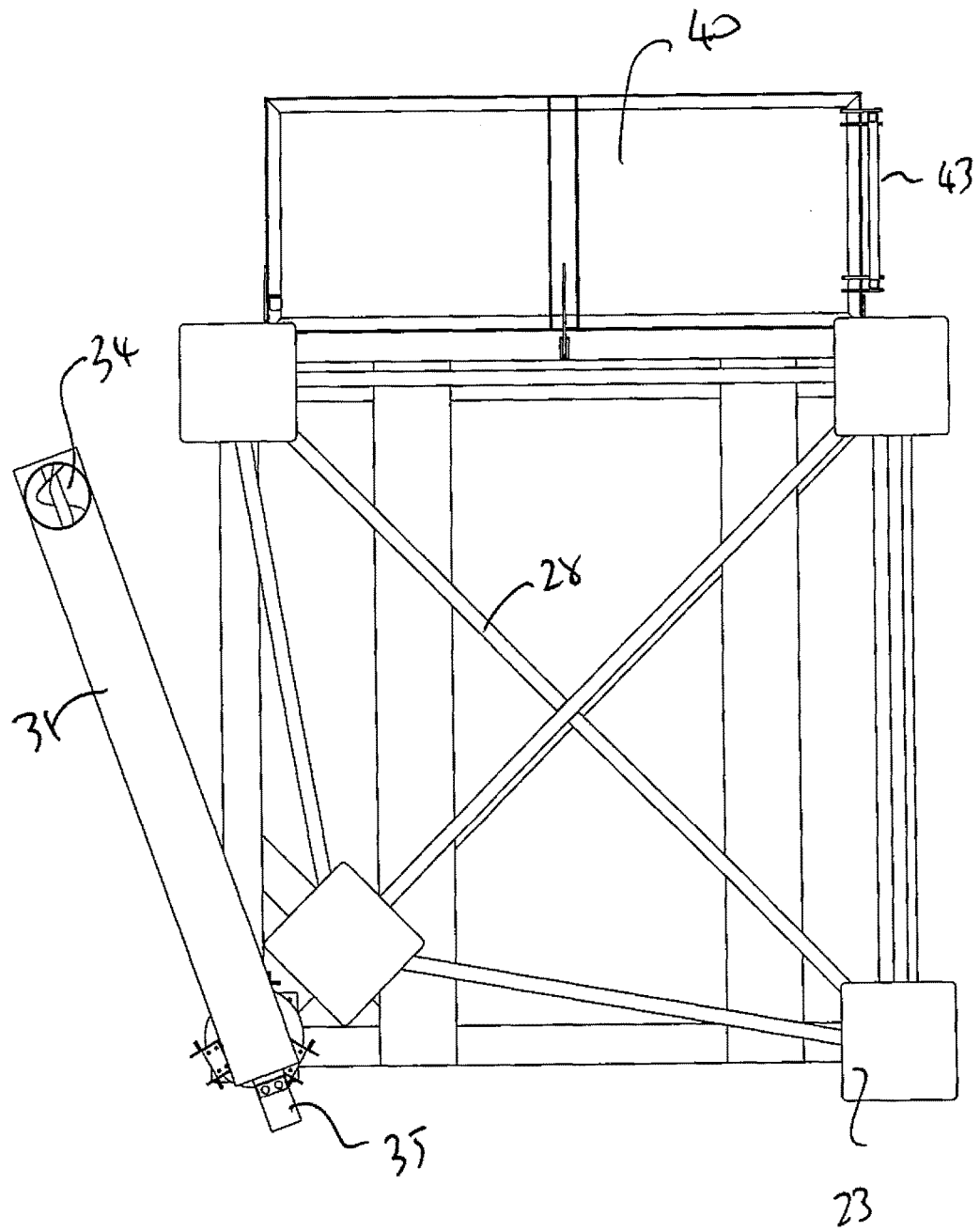
FIG. 8 is a bottom plan view of the tank of FIG. 1.
Figure 9:
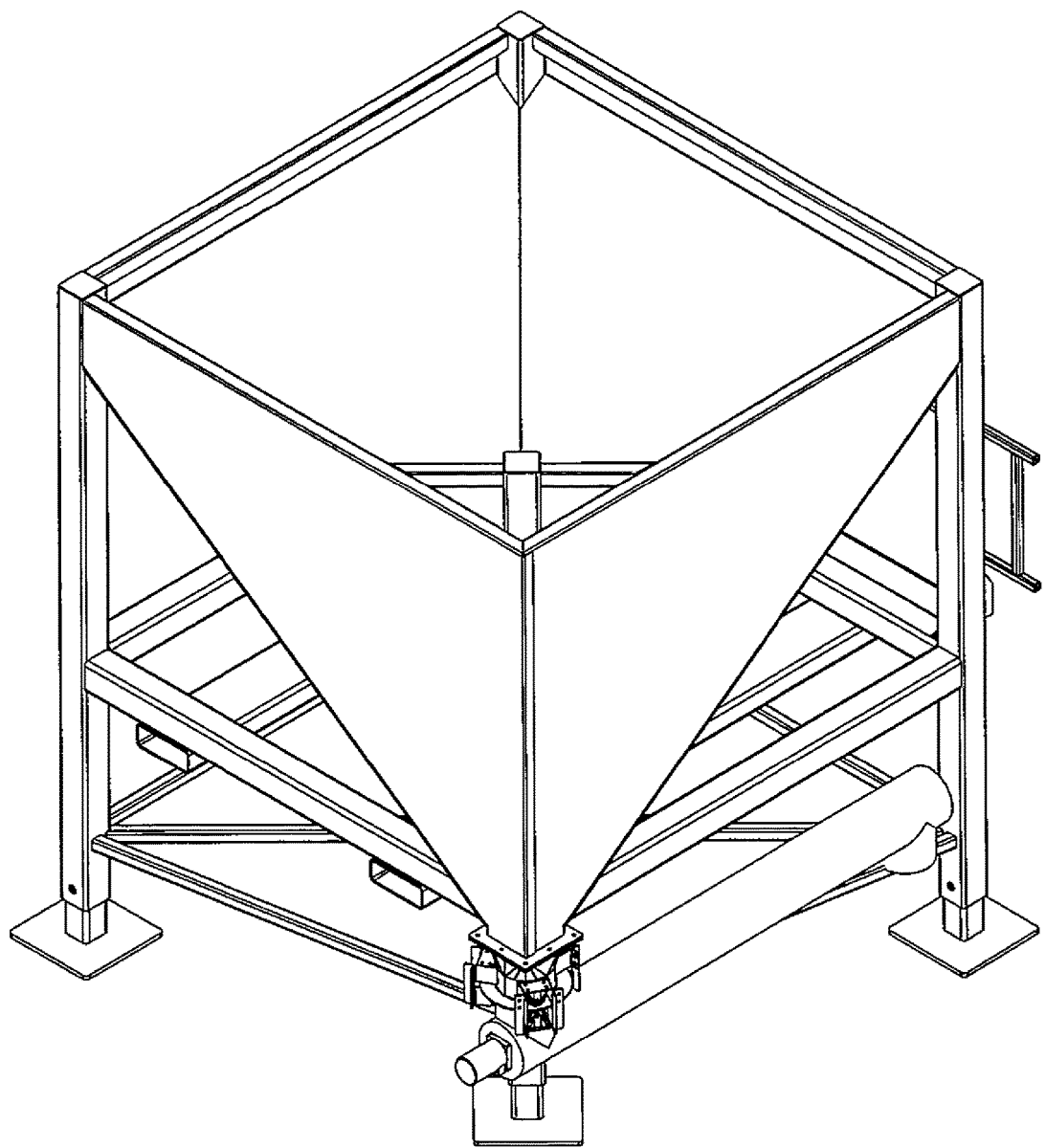
FIG. 9 is an isometric view similar to FIG. 1 from the top and one side of the tank of FIG. 1 showing the tank in the transport position.
Figure 10:
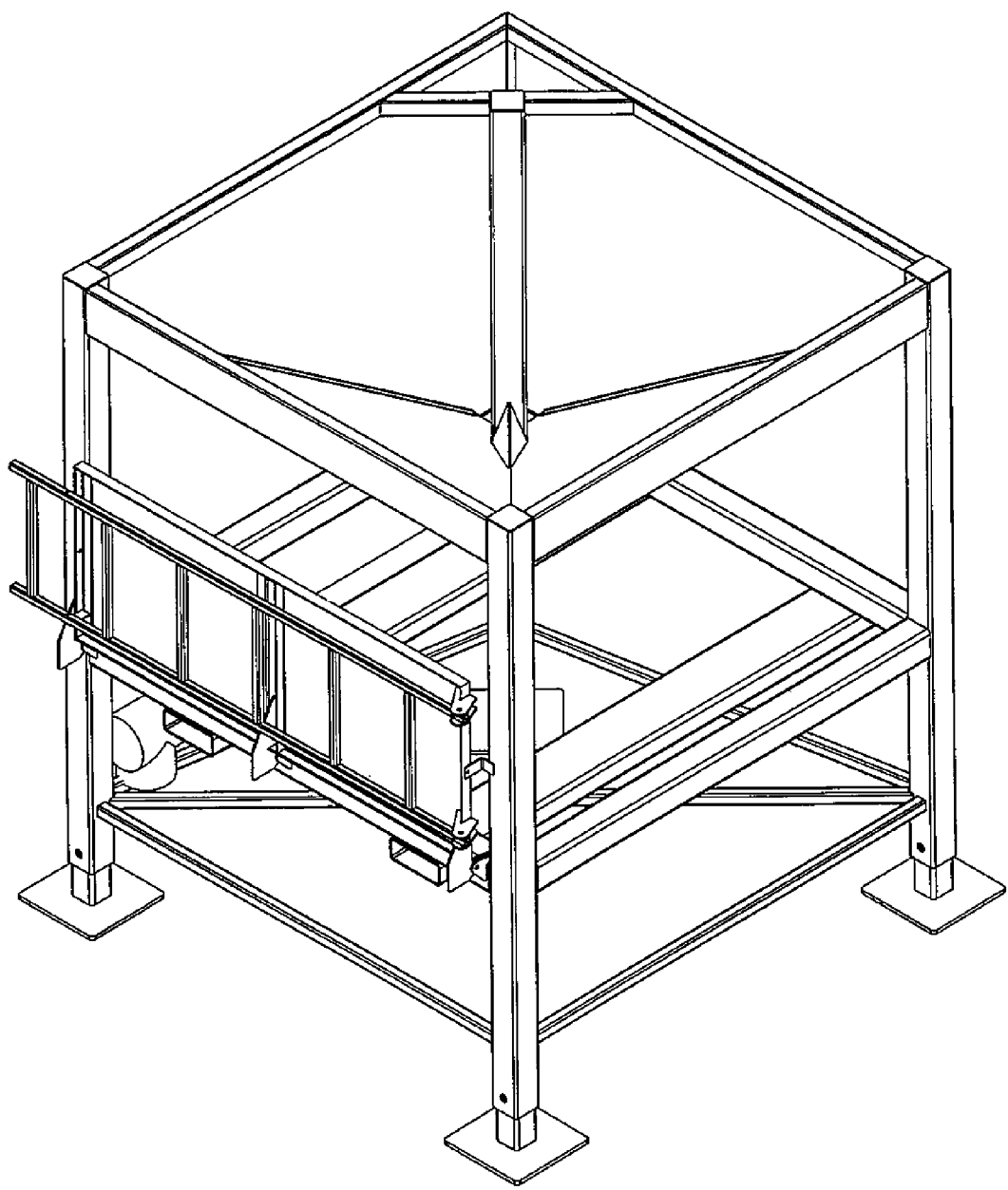
FIG. 10 is an isometric view from the top and opposite side of the tank of FIG. 9 in the transport position.
Figure 11:
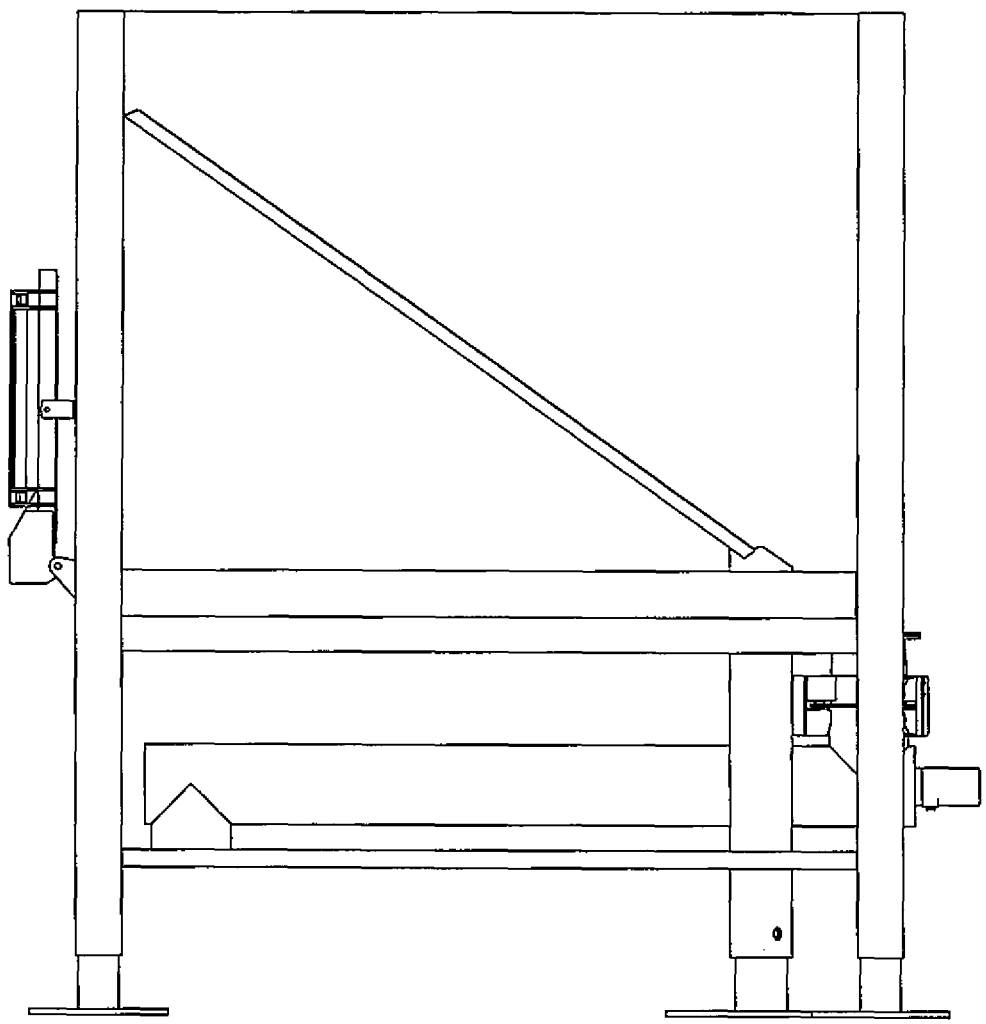
FIGS. 11, 12, 13 and 14 are respective first side elevational views of the four sides of the tank of FIG. 9 in the transport position.
Figure 12:
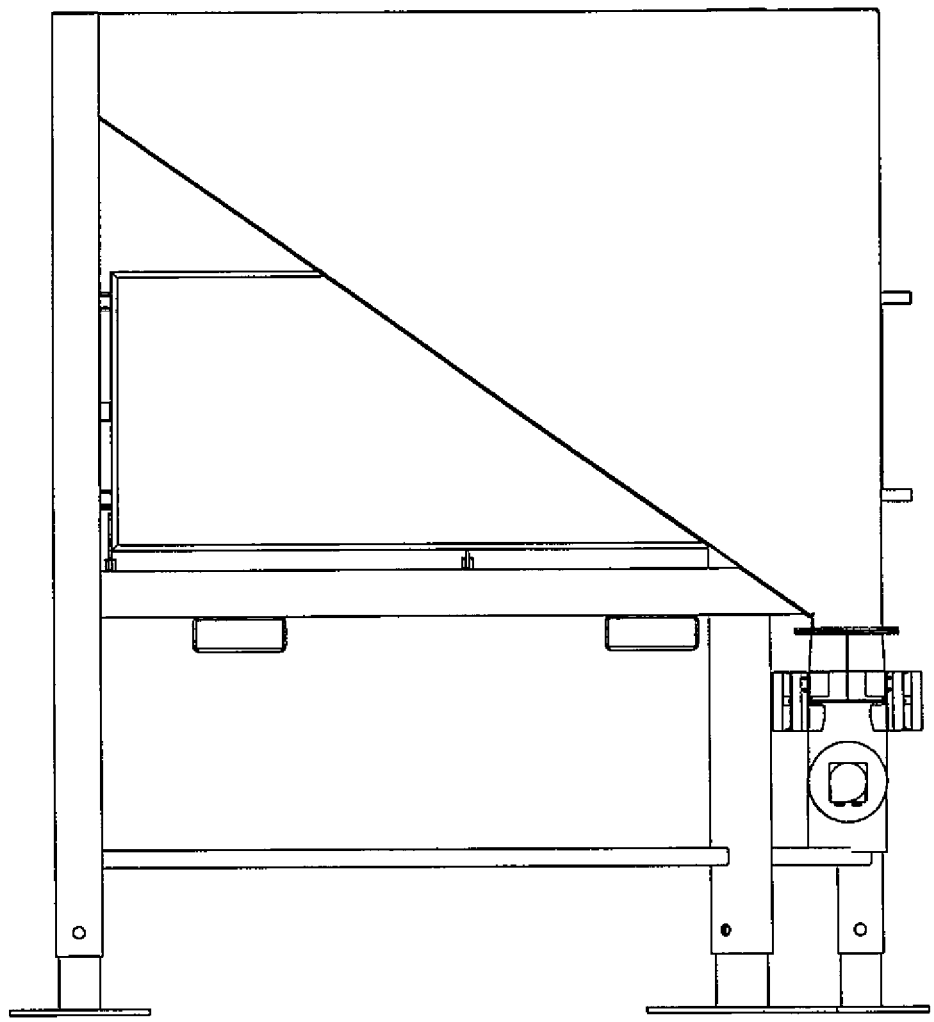
Figure 13:
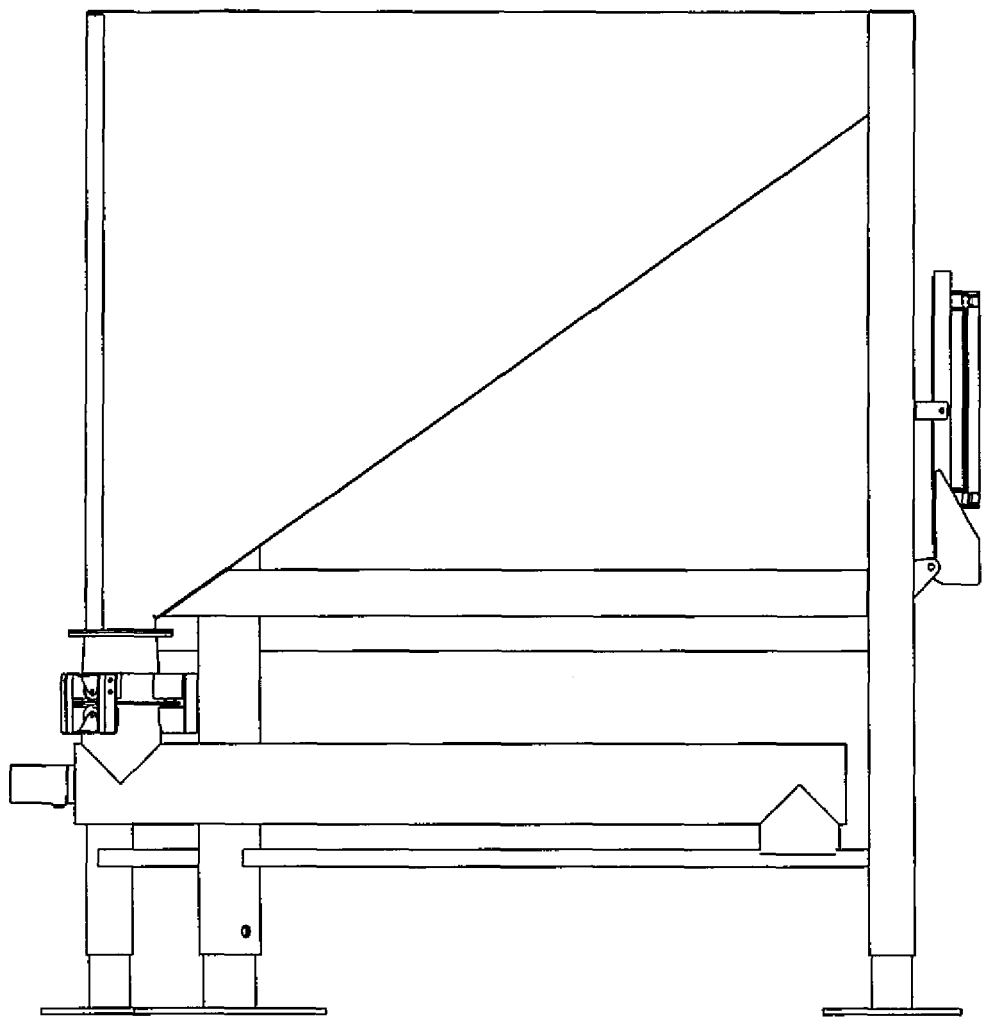
Figure 14:
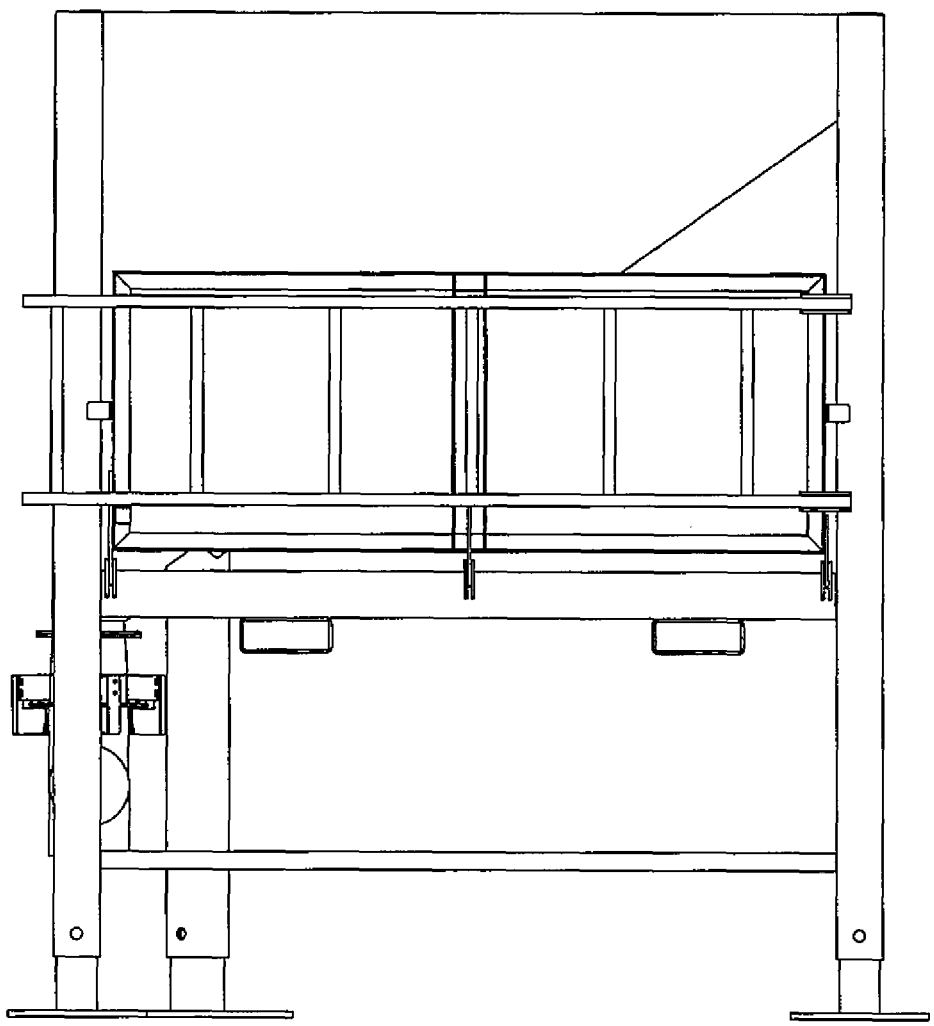
Figure 15:
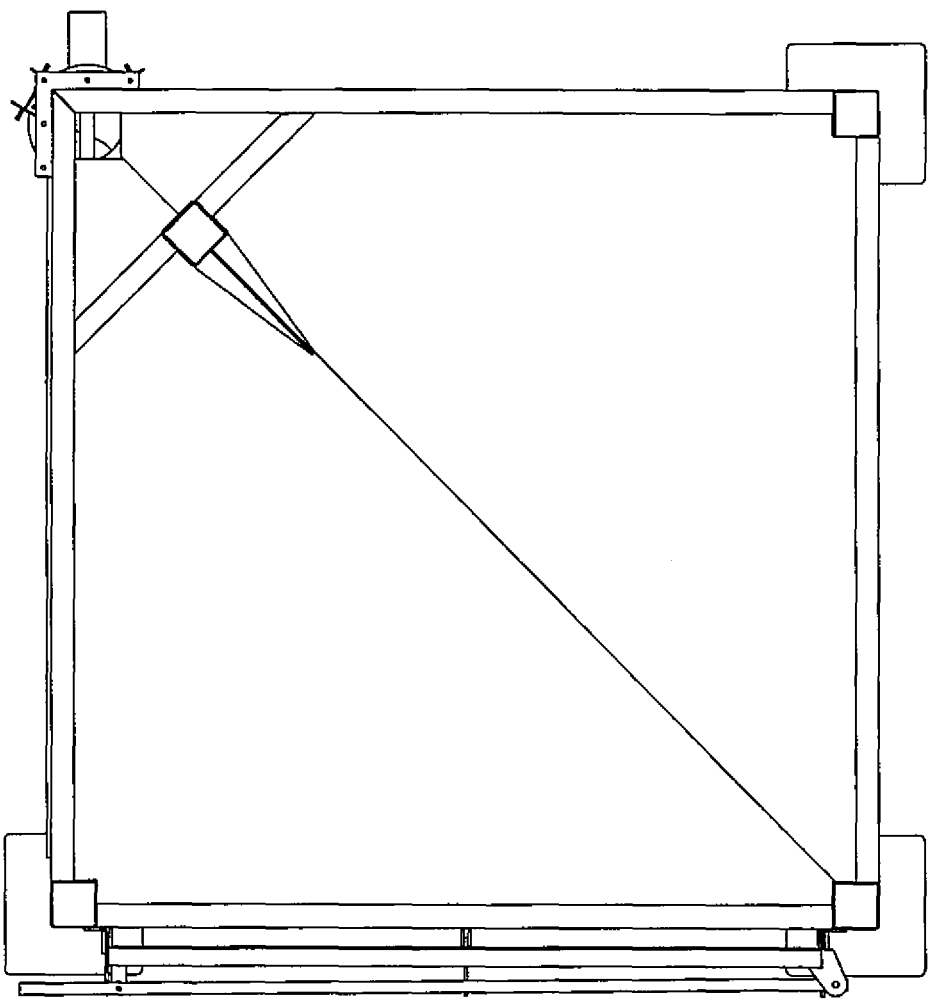
FIG. 15 is a top plan view of the tank of FIG. 9 in the transport position.
Figure 16:
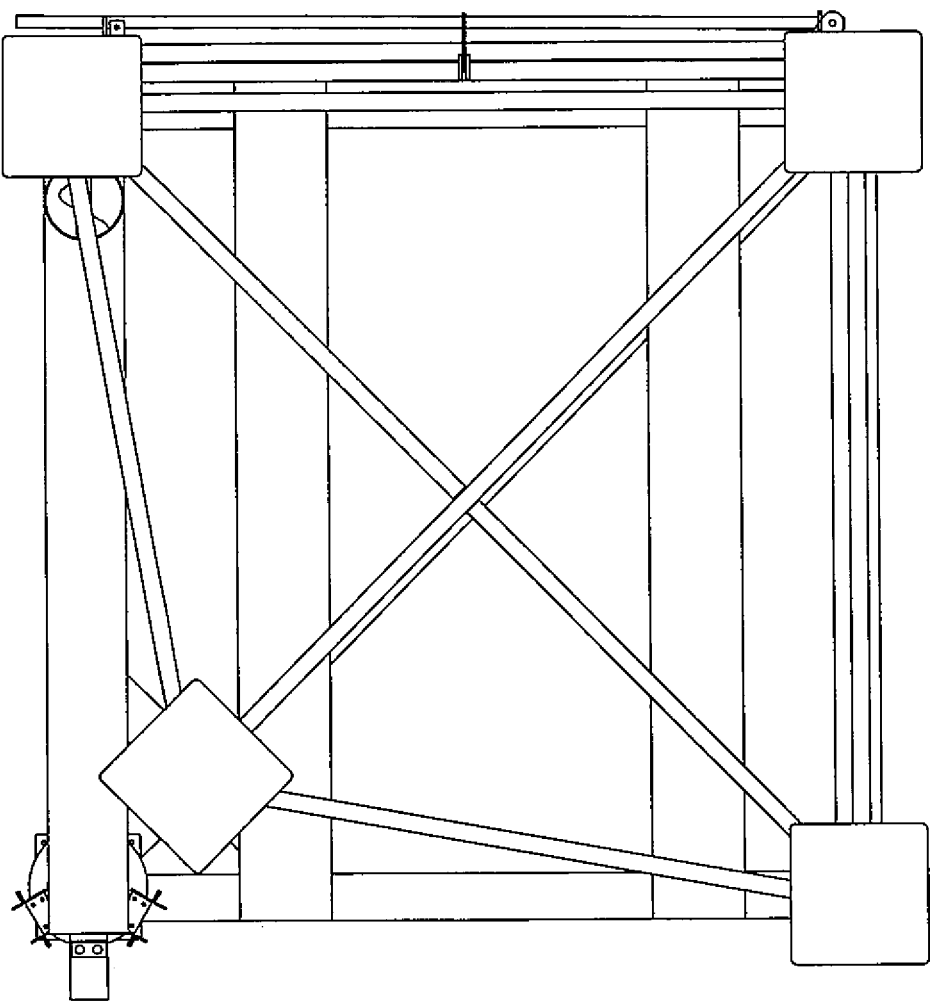
FIG. 16 is a bottom plan view of the tank of FIG. 9 in the transport position.

As best shown in FIG. 2, there is provided a platform 40 mounted on the frame 18 at one side of the tank extending between the legs 20 and 22. The platform is carried at an inner edge 42 of the platform on one of the cross-beams 27 and extends horizontally outwardly therefrom to an outer edge 41 spaced outwardly of the side of the tank. The height of the platform is arranged at the beam 27 so that a person standing on the platform can look over the open top at the wall 16 into the tank for inspection of contents. The length of the platform between ends 44 and 45 matches the width of the tank between the legs 20 and 22. A ladder 43 is mounted at one end 44 of the platform and extends downwardly from the end of the platform to the ground to allow the person to access the platform. The ladder is movable to a stored position on hinges 46 at the end 44 parallel to the platform underneath the platform allowing both the ladder and the platform to be moved to a stored position along the side of the tank by hinging of the platform about hinges 47 at the inner edge 42. That is the platform 40 folds upwardly along the side of the tank between the legs 20 and 22 and the ladder lies outwardly of or underneath the platform. The platform is held in the raised position for transport by latches 47 at the legs 20 and 22.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A storage tank for particulate material comprising:
a tank having a hopper bottom converging to a bottom discharge opening;
a base frame supporting the tank at a position raised from a ground surface on which the base frame can stand;
the hopper bottom being shaped to locate the discharge opening at a side of the base frame;
a discharge conveyor mounted at the discharge opening to transport the particulate material from the discharge opening to an outer end of the conveyor;
the conveyor being mounted for rotation about an upstanding axis at the discharge opening to move the conveyor from a retracted position along a side of the frame to an extended position at a selected angle outwardly from the frame;
the frame being recessed at the discharge opening so that the conveyor is free to rotate from the retracted position to the extended position at the side of the base frame without restriction by the frame.
wherein the frame includes a plurality of upstanding legs and the frame is recessed by one leg being recessed inwardly from the side of the frame.

2. The storage tank according to claim 1 wherein the tank is rectangular and the discharge opening is arranged at one corner.

3. The storage tank according to claim 1 wherein the conveyor rotates in a horizontal plane radial to said upstanding axis.

4. The storage tank according to claim 1 wherein the conveyor comprises a tubular duct with a conveying member inside the duct.

5. The storage tank according to claim 1 wherein the conveyor there is provided a drive member carried on the tank at the discharge opening for rotating the conveyor about said upstanding axis.

6. The storage tank according to claim 1 wherein each of said plurality of legs is extendible from a retracted position in which the conveyor is immediately adjacent the ground to an extended position.

7. A storage tank for particulate material comprising:
a tank having a hopper bottom converging to a bottom discharge opening;
a base frame supporting the tank at a position raised from a ground surface on which the base frame can stand;
the hopper bottom being shaped to locate the discharge opening at one corner of the base frame;
a discharge conveyor mounted at the discharge opening to transport the particulate material from the discharge opening to an outer end of the conveyor;
the conveyor being mounted for rotation about an upstanding axis at the discharge opening to move the conveyor from a retracted position along a side of the frame to an extended position at a selected angle outwardly from the frame;
the frame being recessed at the discharge opening so that the conveyor is free to rotate from the retracted position to the extended position at the side of the base frame without restriction by the frame;
wherein the tank is rectangular and the frame includes at least four upstanding legs with three of the upstanding legs arranged generally at a respective three of the corners of the tank;
and wherein a fourth one of the four legs is spaced away from the respective fourth corner.

8. The storage tank according to claim 7 wherein the conveyor is movable from a first retracted position extending from said one corner along a first side of the tank to a second one of the legs to a second retracted position extending from the corner along a second side of the tank to a third one of the legs.

9. The storage tank according to claim 7 wherein the conveyor rotates in a horizontal plane radial to said upstanding axis.

10. The storage tank according to claim 7 wherein the conveyor comprises a tubular duct with a conveying member inside the duct.

11. The storage tank according to claim 7 wherein there is provided a drive member carried on the tank at the discharge opening for rotating the conveyor about said upstanding axis.

12. The storage tank according to claim 7 wherein each of said plurality of legs is extendible from a retracted position in which the conveyor is immediately adjacent the ground to an extended position.

13. A storage tank for particulate material comprising:
a tank having a hopper bottom converging to a bottom discharge opening;
a base frame supporting the tank at a position raised from a ground surface on which the base frame can stand;
the hopper bottom being shaped to locate the discharge opening at a side of the base frame;
a discharge conveyor mounted at the discharge opening to transport the particulate material from the discharge opening to an outer end of the conveyor;
the conveyor being mounted for rotation about an upstanding axis at the discharge opening to move the conveyor from a retracted position along a side of the frame to an extended position at a selected angle outwardly from the frame;
wherein the tank is rectangular and the discharge opening is arranged at one corner;
wherein the frame includes a plurality of upstanding legs and the frame is recessed with one leg of the plurality of upstanding legs being recessed inwardly from the side of the frame;
wherein there is provided a platform mounted on the frame at one side of the tank and extending horizontally outwardly therefrom and a ladder which extends downwardly from one end of the platform;
and wherein the ladder is movable to a stored position parallel to the platform and both the ladder and the platform are movable to a stored position along the side of the tank.

14. The storage tank according to claim 13 wherein the platform folds upwardly along the side of the tank and the ladder lies outwardly of the platform.

15. The storage tank according to claim 13 wherein the hopper bottom includes four sides each extending along a respective side of the rectangular tank and each converging to one corner of the tank at said recessed leg.

16. The storage tank according to claim 13 wherein the conveyor is movable from a first retracted position extending from the corner along a first side of the tank to a second one of the legs to a second retracted position extending from the corner along a second side of the tank to a third one of the legs.

17. The storage tank according to claim 13 wherein the conveyor rotates in a horizontal plane radial to the axis.

18. The storage tank according to claim 13 wherein there is provided a drive member carried on the tank at the discharge opening for rotating the conveyor about said upstanding axis.

19. The storage tank according to claim 13 wherein each of said plurality of legs is extendible from a retracted position in which the conveyor is immediately adjacent the ground to an extended position.

* * * * *